United States Patent
Lin

(10) Patent No.: US 8,010,775 B2
(45) Date of Patent: *Aug. 30, 2011

(54) METHOD AND RELATED APPARATUS FOR REDUCING CHIPSET POWER CONSUMPTION

(75) Inventor: Jiing Lin, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 430 days.

This patent is subject to a terminal disclaimer.

(21) Appl. No.: 12/252,346

(22) Filed: Oct. 15, 2008

(65) Prior Publication Data

US 2009/0037757 A1 Feb. 5, 2009

Related U.S. Application Data

(63) Continuation of application No. 11/161,525, filed on Aug. 8, 2005, now Pat. No. 7,469,352.

(30) Foreign Application Priority Data

Oct. 29, 2004 (TW) ................................. 93132994 A

(51) Int. Cl.
| G06F 12/00 | (2006.01) |
| G06F 12/06 | (2006.01) |
| G06F 9/445 | (2006.01) |
| G06F 15/177 | (2006.01) |
| G06F 1/32 | (2006.01) |

(52) U.S. Cl. ............ 713/1; 713/100; 713/300; 713/310; 713/320; 713/323; 713/324; 713/340; 711/1; 711/2; 711/5; 710/8; 710/9

(58) Field of Classification Search ................... 713/1, 2, 713/100, 300, 310, 320–324, 330, 340; 711/1–5, 711/100, 105, 170–172, 200–202, 211, 212; 710/8, 9
See application file for complete search history.

(56) References Cited

U.S. PATENT DOCUMENTS

| 5,875,201 | A * | 2/1999 | Bauman et al. ............... 714/800 |
| 6,038,637 | A   | 3/2000 | Berube et al. |
| 6,199,153 | B1 * | 3/2001 | Razdan et al. ............... 711/212 |
| 2006/0004981 | A1 | 1/2006 | Bains |
| 2006/0039205 | A1 | 2/2006 | Cornelius |
| 2006/0041713 | A1 | 2/2006 | Charles et al. |

FOREIGN PATENT DOCUMENTS

JP 7-84988 3/1995

* cited by examiner

*Primary Examiner* — Thomas Lee
*Assistant Examiner* — Fahmida Rahman
(74) *Attorney, Agent, or Firm* — Winston Hsu; Scott Margo

(57) ABSTRACT

A method for reducing computer system power consumption. The computer system includes a memory module having a plurality of address pins, and a chipset having a plurality of driving units for driving the address pins. The method includes obtaining number of required address pins by detecting a capacity of the memory module, and disabling the driving units so as to make a number of the active driving units substantially equal to the number of the required address pins.

10 Claims, 5 Drawing Sheets

METHOD AND RELATED APPARATUS FOR REDUCING CHIPSET POWER CONSUMPTION

CROSS REFERENCE TO RELATED APPLICATIONS

This continuation application claims the benefit of application Ser. No. 11/161,525 filed on Aug. 8, 2005 and incorporated herein in its entirety.

BACKGROUND OF THE INVENTION

1. Field of the Invention

The present invention relates to a method and related apparatus for reducing power consumption, and more particularly, to a method and related apparatus for reducing chipset power consumption while accessing memory modules.

2. Description of the Prior Art

Computer systems are indispensable to the information society. With the computer system, it is convenient for users to calculate, access, and manage a large amount of information, data, and video at high speed. Therefore, information technology manufacturers have been devoted to improving the performance of computer systems to manage data more securely and speedily. However, while the performance of computer systems is improved, how to reduce power consumption becomes an important issue.

Generally, a typical computer system comprises a central processing unit (CPU), a chipset, a memory device, and other peripheral circuits. The CPU can process information and data to control the operation of the computer system. The memory device, such as a dynamic random-access memory (DRAM), can temporarily store programs, and data required by the CPU. The chipset can manage the communication between the CPU (or other peripheral circuits) and the memory device.

Data is stored in the memory device and has a corresponding address that allows random access. In the computer system, the memory device includes several memory modules. Each memory module has a plurality of address pins, each address pin being used for receiving a one-bit address. The chipset includes a plurality of driving units respectively connected to the address pins of each memory module, each driving receiving power and outputting a one-bit address to a corresponding address pin. When the chipset accesses data of a certain address in the memory device, the chipset will control the driving units respectively to output a one-bit address to the corresponding address pins. Then the memory module gathers all one-bit addresses to obtain a complete address, such as a row address (RAS) or a column address (CAS). According to the assigned address, the chipset can access the required data.

In the prior art, memory modules are independent circuits and combined into a memory device, which is electrically connected to the computer system by insertion into a slot. Depending on the user's budget and requirement, the user can install the required memory capacity. As known in the art, a larger memory capacity requires more bits to assign addresses. Generally, driving units of the chipset are more than address pins of the memory device so as to support different memory capacities or larger memory capacities. For instance, most chipsets can support a 4 GB memory capacity. However, most memory device configurations have a memory capacity smaller than 4 GB and thereby require fewer address bits.

Current chipsets can support the configuration for 2-bit bank addresses and 14-bit RAS/CAS addresses, and therefore the typical chipset includes 16 driving units. Actually, it is only necessary to have 2-bit bank addresses and 12-bit RAS/CAS addresses to assign an address in a 64 MB memory module. However, in the prior art, no matter whether the configuration of the memory module is smaller than the memory capacity supported by the chipset, each driving unit of the chipset still consumes power. Thus, when the prior art computer system accesses the memory device, some address pins of the memory module are not used, but the corresponding driving units still consume power increasing overall power consumption.

SUMMARY OF THE INVENTION

It is therefore a primary objective of the claimed invention to provide a method for reducing chipset power consumption while accessing a memory module to solve the above-mentioned problem.

The claimed invention provides a method for reducing computer system power consumption. The computer system includes a memory module having a plurality of address pins, and a chipset having a plurality of driving units for driving the address pins. The method includes obtaining number of required address pins by detecting a capacity of the memory module, and disabling the driving units so as to make a number of the active driving units substantially equal to the number of the required address pins.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
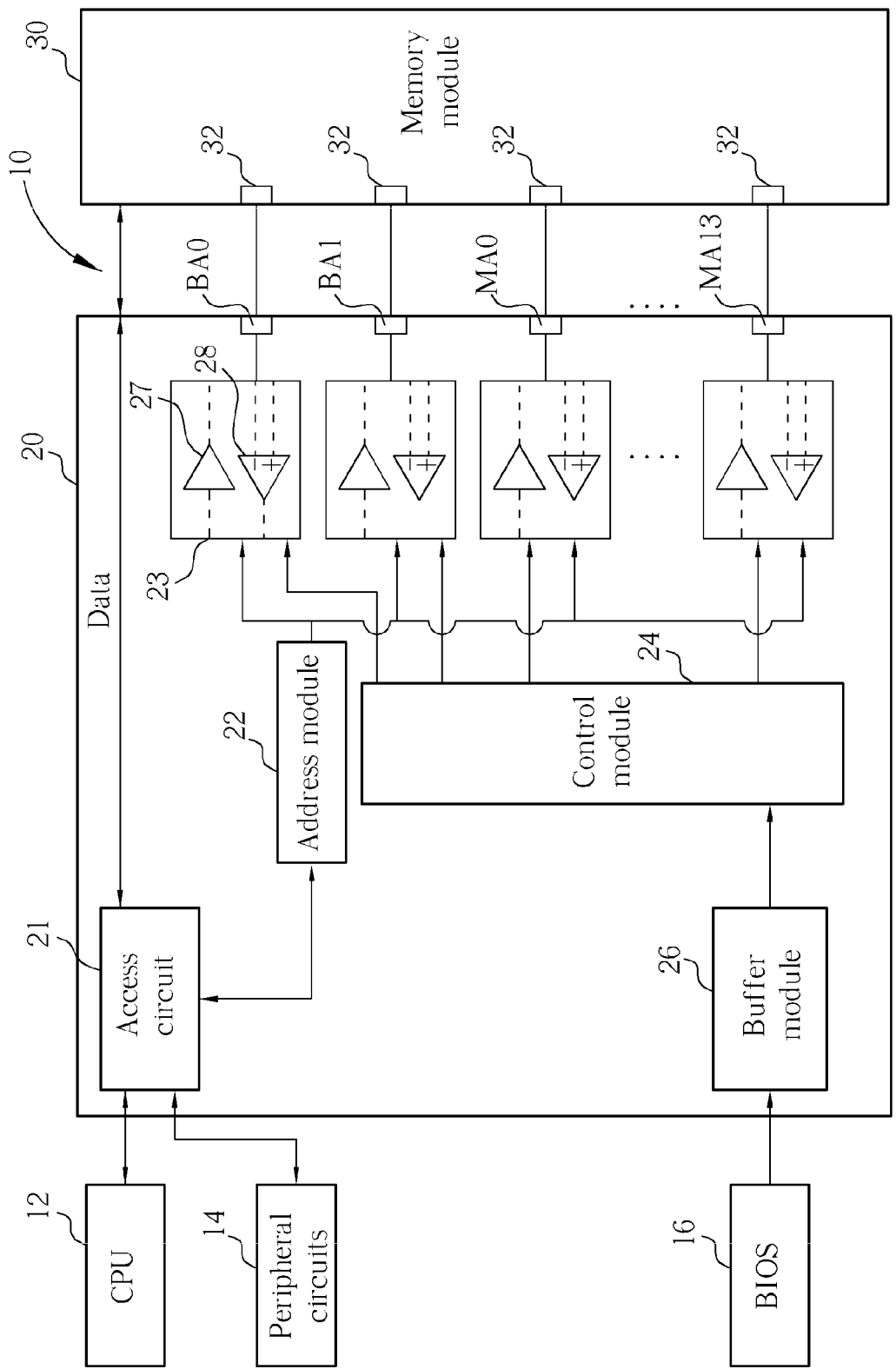
FIG. 1 is a diagram of a computer system according to the present invention.

Please refer to FIG. 1, which is a diagram of a computer system 10 according to the present invention. The computer system comprises a central processing unit (CPU) 12, a peripheral circuit 14, a basic input/output system (BIOS) 16, a chipset 20, and a memory module 30. The CPU 12 processes information and data to control the operation of the computer system 10. The memory module 30 temporarily stores programs and data required by the CPU 12. The peripheral circuit 14 can be a hard disc, an optical disc drive or inserted cards, such as a graphic card, a network interface card, a sound card, etc. When booting the computer system, the BIOS 16 not only stores settings and program codes for the basic inspection, but also detects the configuration of the memory module 30 to generate corresponding configuration information. The chipset 20 manages the communications among the CPU 12, the memory module 30, the peripheral circuit 14, and the BIOS 16.

In order to implement the present invention, the chipset 20 includes an access circuit 21, an address module 22, a plurality of driving units 23 (this embodiment has 16 driving units 23), a control module 24, and a buffer module 26. The access circuit 21 receives the request from the CPU 12 (or the peripheral circuit 14) to write data into and read data from a specific address of the memory module 30. Each driving unit 23 includes one or more output buffers 27 for outputting a sub-address, and one or more input amplifiers 28 (such as a driving amplifier) for receiving signals input into the driving unit 23. Each driving unit 23 corresponds to a pin, as marked as BA0, BA1, and MA0 to MA13 in FIG. 1, connected to an address pin 32 of the memory module 30. When the access circuit 21 writes data in a determined address of the memory module 30, the address module 22 controls each driving unit 23 based on the determined address accordingly, such that each driving unit 23 outputs one-bit (a sub-address) of the determined address. The control module 24 controls the output buffers 27 or the input amplifiers 28 of the driving units 23 to output or receive signals. In addition, the buffer module 26 temporarily stores the configuration of the memory module 30 detected by the BIOS 16 when booting the computer system 10. When the chipset 20 operates, the control module 24 determines which driving units 23 are required by the memory module 30 based on information of the buffer module 26 so as to disable (i.e. turn off) unused driving units 23. Since disabled driving units 23 will stop draining power and stop driving corresponding pins, power consumption can be reduced.

Figure 2:
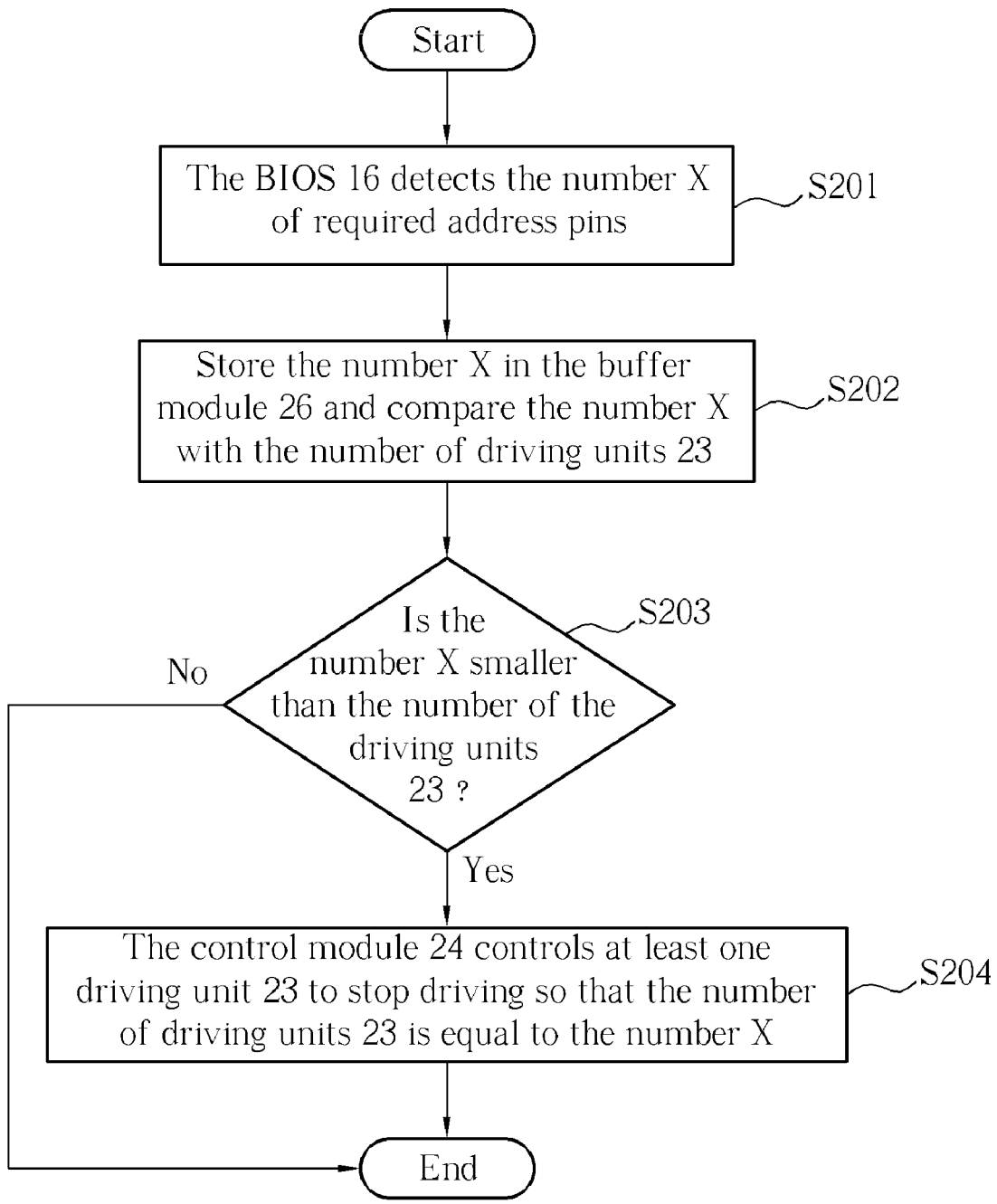
FIG. 2 is a flowchart of the operation of the chipset of FIG. 1.

Please refer to FIG. 2, which is a flowchart of the operation of the chipset 20. The steps are as follows.

Step S201: When the computer system 10 is booted, the BIOS 16 detects the configuration of the memory module 30 to determine how many bits are required to assign an address so that number X of required address pins is determined.

Step S202: The number X is stored in the buffer module 26 and is compared to the number of the driving units 23 of the chipset 20.

Step S203: Determine whether the number X is smaller than the number of the driving units 23 of the chipset 20. If smaller than the number of the driving units 23, step S204 is performed.

Step S204: When the number X is smaller than the number of the driving units 23, the control module 24 determines which driving units 23 are unused based on the information of the buffer module 26, and disables such unused driving units 23, such that the number of the driving units driven by the chipset 20 is equal to the number X of required address pins to reduce power consumption. If the number X is not smaller than the number of the driving units 23, the control module 24 does not disable any driving units 23.

For instance, if the memory capacity of the memory module 30 has 256 MB, which requires 2-bit bank addresses and 13-bit RAS/CAS addresses (13-bitRAS addresses and 10-bit CAS addresses) for addressing, the control module 24 can disable the driving unit 23 corresponding to the pin MA13. Pins BA0, BA1 and MA0 to MA12 are used to support the configuration of the memory module 30. Similarly, if the memory capacity of the memory module 30 has 128 MB, which requires 1-bit bank addresses and 13-bit RAS/CAS addresses (13-bit RAS addresses and 10-bit CAS addresses) for addressing, the control module 24 disables the driving units 23 corresponding to pins BA1 and MA13. Fourteen driving units 23 corresponding to pins BA0, and MA0 to MA12 are used to access the memory module 30.

Figure 3:
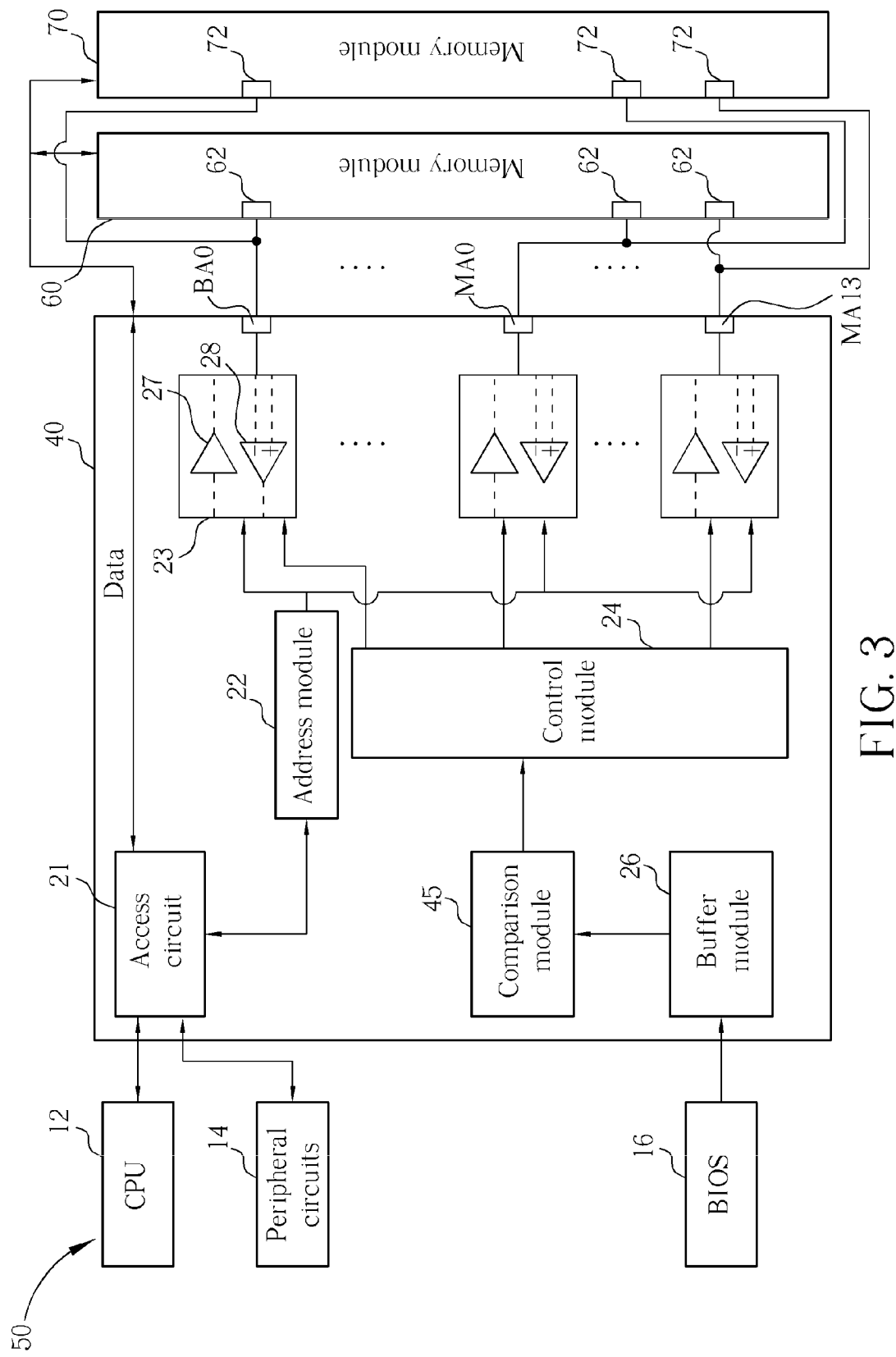
FIG. 3 is a diagram of another embodiment of a computer system based on the present invention.

Please refer to FIG. 3, which is a diagram of another embodiment of a computer system 50 based on the present invention. Devices or elements of the computer system 50 in FIG. 3 that have the same functions as those of the computer system 10 in FIG. 1 have the same reference numerals, and repeated details are omitted. In FIG. 3, the computer system 50 comprises two memory modules 60 and 70 using the same bus line connected to the chipset 40. In other words, the same driving unit 23 is connected to address pins 62 and 72 of the memory modules 60 and 70. Another difference from the embodiment of FIG. 1 is that the chipset 40 of FIG. 3 further includes a comparison module 45. The memory modules 60 and 70 use the same bus line in the computer system 50, but the configurations of the two memory modules 60 and 70 might not be the same. The comparison module 45 is used to determine which memory module requires more bits to assign addresses and disables (i.e. turns off) driving units 23 accordingly. Briefly, the comparison module 45 is capable of determining the configurations of the memory modules 60 and 70 so as to disable driving units 23 accordingly.

Figure 4:
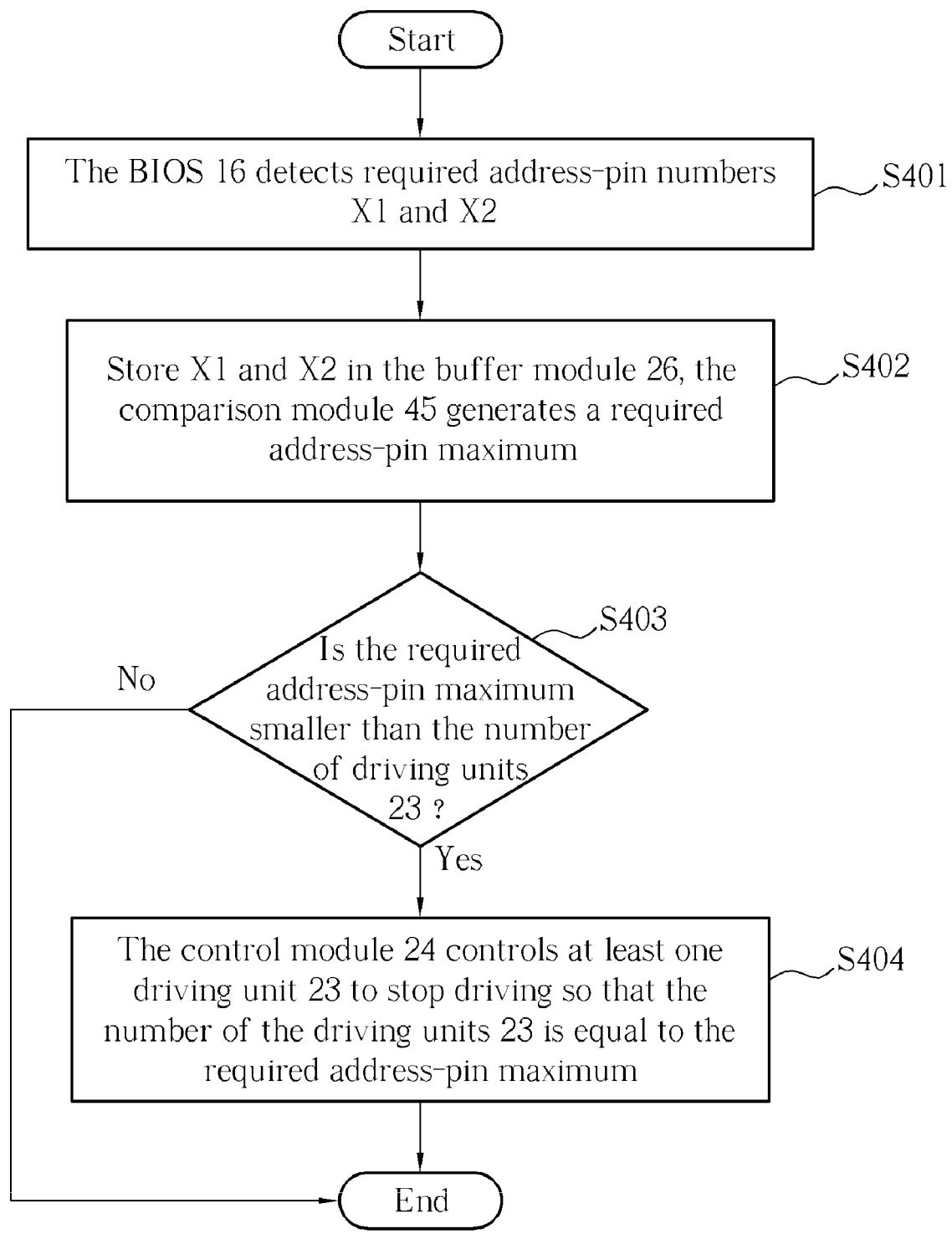
FIG. 4 is a flowchart of the operation of the chipset of FIG. 3.

Please refer to FIG. 4, which is a flowchart of the operation of the chipset 40. The steps are as follows.

Step S401: When the computer system 50 is booted, the BIOS 16 detects the configurations of the memory modules 60 and 70 to determine how many bits are required to assign an address so that a first number X1 and a second number X2 of address pins respectively required by the memory modules 60 and 70 are determined. The first address-pin number X1 comprises numbers of pins for addressing first bank address and first RAS/CAS address, and the second address-pin number X2 comprises numbers of pins for addressing second bank address and second RAS/CAS address.

Step S402: The numbers X1 and X2 are stored in the buffer module 26. The control module 45 derives the numbers of first bank-address pins and second bank-address pins from the numbers of X1 and X2, and sets the maximum of the first bank-address number and the second bank-address number to a bank-address-pin maximum. Also, a RAS/CAS-address-pin maximum is derived from the maximum of the first and the second RAS/CAS-address-pin numbers. The control module 45 determines a required address-pin maximum according to the RAS/CAS-address-pin maximum and the bank-address-pin maximum.

Step S403: The required address-pin maximum is compared with the number of driving units 23 of the chipset 20. When the required address-pin maximum is smaller than the number of the driving units 23, step S404 is performed.

Step S404: When the required address-pin maximum is smaller than the number of the driving units 23, the control module 24 determines which driving units 23 are unused based on the information of the buffer module 26, and disables such unused driving units 23, such that the number of the driving units driven by the control module 45 is equal to the required address-pin maximum to reduce power consumption. If the required address-pin maximum is not smaller than the number of the driving units 23, the control module 24 does not disable any driving units 23.

Figure 5:
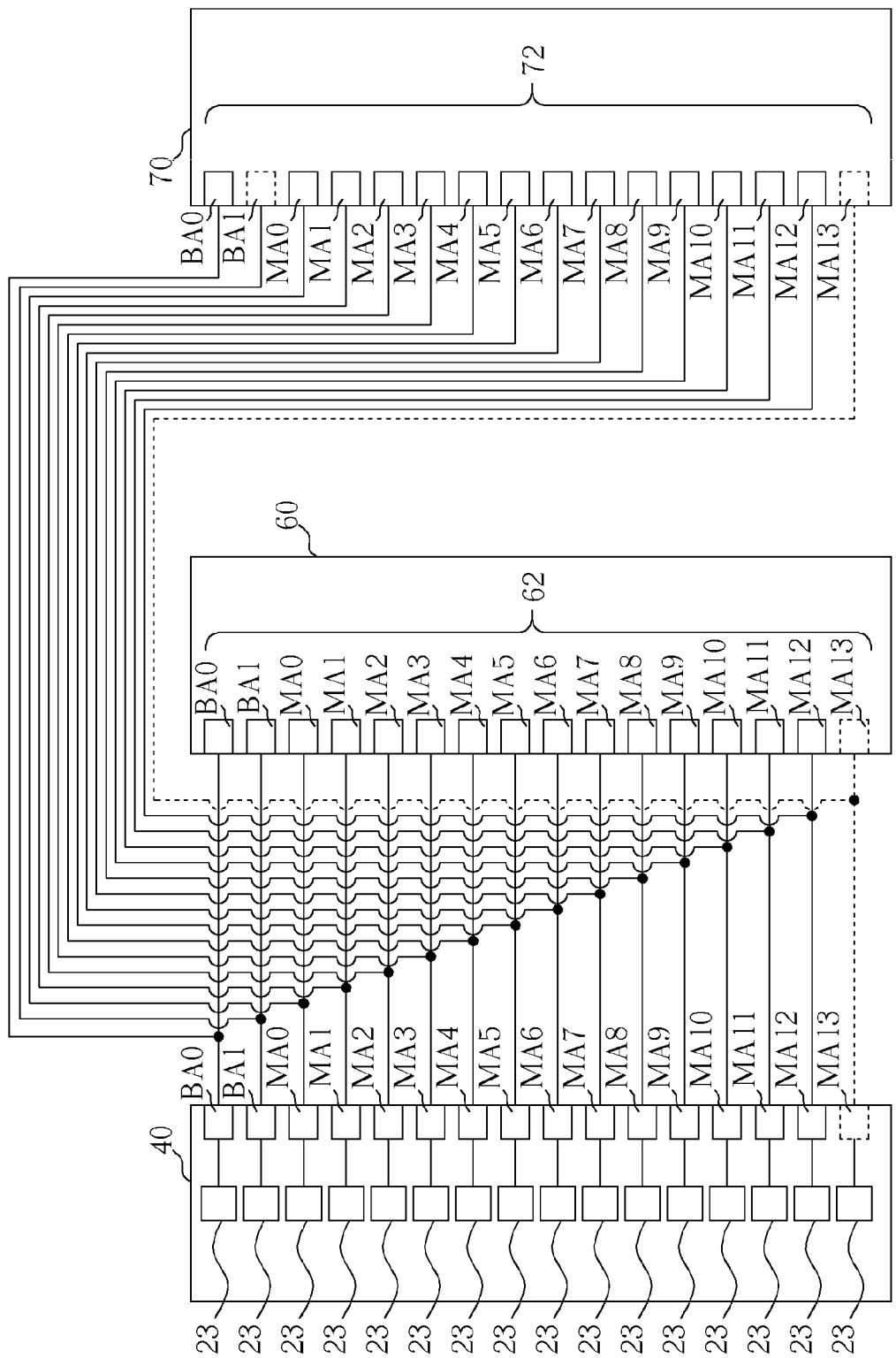
FIG. 5 is a diagram of the operation of each driving unit when the computer system of FIG. 3 is working.

Please refer to FIG. 5, which is a diagram of the operation of each driving unit when the computer system 50 of FIG. 3 is working. Suppose that the chipset 40 supports 2-bit bank addresses (BA0 and BA1) and 14-bit RAS/CAS addresses (MA0~MA13), each bank and RAS/CAS address corresponding to a driving unit 23. Therefore, the chipset includes 16 driving units 23, and corresponding memory modules 60 and 70 respectively include 16 address pins 62 and 72 for receiving sub-addresses from the chipset 40. Suppose that the memory capacity of the memory module 60 is 64 MB, which requires 2-bit bank addresses, 12-bit RAS addresses, and 9-bit CAS addresses. Therefore, assigning address requires BA0, BA1 and MA0 to MA11. Generally, bits of RAS address are more than bits of CAS address, and an RAS address is transmitted before a corresponding CAS address is transmitted. The memory capacity of the memory module 70 is 128 MB, which requires 1-bit bank addresses, 13-bit RAS addresses, and 10-bit CAS addresses, requiring BA0, BA1 and MA0 to MA12 to assign addresses. Since the memory modules 60 and 70 use the same bus line, the memory module 70 only needs BA0 while the memory module 60 still requires both BA0 and BA1. Therefore, the control module 24 determines that the bank-address-pin maximum is 2 and that the RAS/CAS-address-pin maximum is 13 according to the configurations of the memory modules 60 and 70. To access the memory modules 60 and 70, BA0, BA1 and MA0 to MA12 are used. The control module 24 will disable the driving unit 23 corresponding to pin MA13. In FIG. 5, the dotted line represents unused address pins 62 and 72 or address pins corresponding to unused driving units 23. For instance, MA13 of the memory module 60, BA1 and MA13 of the memory module 70, and MA13 of the chipset 40 are unused.

Additionally, each module of the presented invention can be implemented by hardware or firmware codes. For instance, the comparison module 45 and the control module 24 can be logic circuits. In summary, the BIOS 16 automatically detects the configurations of the memory modules 60 and 70 when the computer system 50 is booted. The comparison module 45 of the chipset 40 determines which address pins 62 and 72 are unused according to the detecting result. Then the control module 24 disables such unused driving units 23. When the computer system 50 accesses the memory module 60 or 70, the disabled driving units 23 do not receive/consume power. The present invention can disable unused driving units 23 properly when accessing data so as to reduce power consumption. Therefore, when accessed data is larger, power consumption is reduced by disabling unused driving units 23.

The present invention detects configurations of each memory module by the BIOS when booting the computer system, and determines how many address pins are unused accordingly. Then the chipset disables corresponding driving units to reduce power consumption. For instance, suppose that the chipset can support 2-bit bank addresses and 14-bit RAS/CAS addresses, and therefore includes 16 driving units. The memory device includes two memory modules. One has 64 MB and requires 2-bit bank addresses and 12-bit RAS/CAS addresses to assign addresses, and the other has 256 MB and requires 2-bit bank addresses and 13-bit RAS/CAS addresses to assign addresses. According to the configurations of the memory modules, the chipset only has to drive 15 driving units to output 2-bit bank addresses and 13-bit RAS/CAS addresses so as to access the two memory modules. As mentioned above, the present invention utilizes the BIOS to detect the configurations of memory modules, and then determines which address pins are unused accordingly. The control module disables driving units corresponding to unused address pins so as to reduce power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for driving a plurality of address pins of a memory module by a plurality of driving units of a chipset, comprising:
   determining a number of the address pins that is required according to a capacity of the memory module, all the driving units corresponding to the memory module;
   disabling a portion of the driving units corresponding to the memory module so as to make a number of the active driving units substantially equal to the number of the required address pins;
   comparing the number of the required address pins with the total number of the driving units, if the number of the required address pins is smaller, disabling the driving units which are not going to be used; and
   detecting the capacity of the memory module by a basic input/output system (BIOS).

2. The method of claim 1 wherein the required address pins comprise pins for addressing bank address and RAS/CAS address.

3. The method of claim 1 wherein the number of the required address pins is the total number of pins for addressing bank address and RAS/CAS address.

4. A computer system comprising:
   a memory module addressed and accessible by a plurality of address pins; and
   a chipset having a plurality of driving units and a control module, wherein the control module disables the driving units which are not going to be used for driving the corresponding address pins;
   wherein a number of address pins which is required for addressing the memory module is determined according to the capacity of the memory module;
   wherein the driving units of the address pins for addressing the memory module are enabled; otherwise, the driving units of the address pins which are not used for addressing the memory module are disabled,
   wherein all the driving units correspond to the memory module,
   wherein the number of the required address pins is the total number of the pins for addressing bank address and RAS/CAS address.

5. The computer system of claim 4, wherein the control module disables the driving units of address pins that are not used for addressing the memory module.

6. The computer system of claim 4 further comprising a buffer module for storing the number of the required address pins.

7. The computer system of claim 4 further comprising a basic input/output system for detecting the capacity of the memory module.

8. The computer system of claim 4 wherein the required address pins comprise pins for addressing the bank address and RAS/CAS address.

9. The computer system of claim 4 further comprising a comparison module for comparing the number of the address pin number with the number of the driving units.

10. The computer system of claim 4 further comprising an input amplifier in each said driving unit.

* * * * *